Oct. 8, 1963  T. R. BREUNICH  3,106,415
CLEVIS FOR PUSH-PULL CONTROL DEVICES
Original Filed Nov. 20, 1958
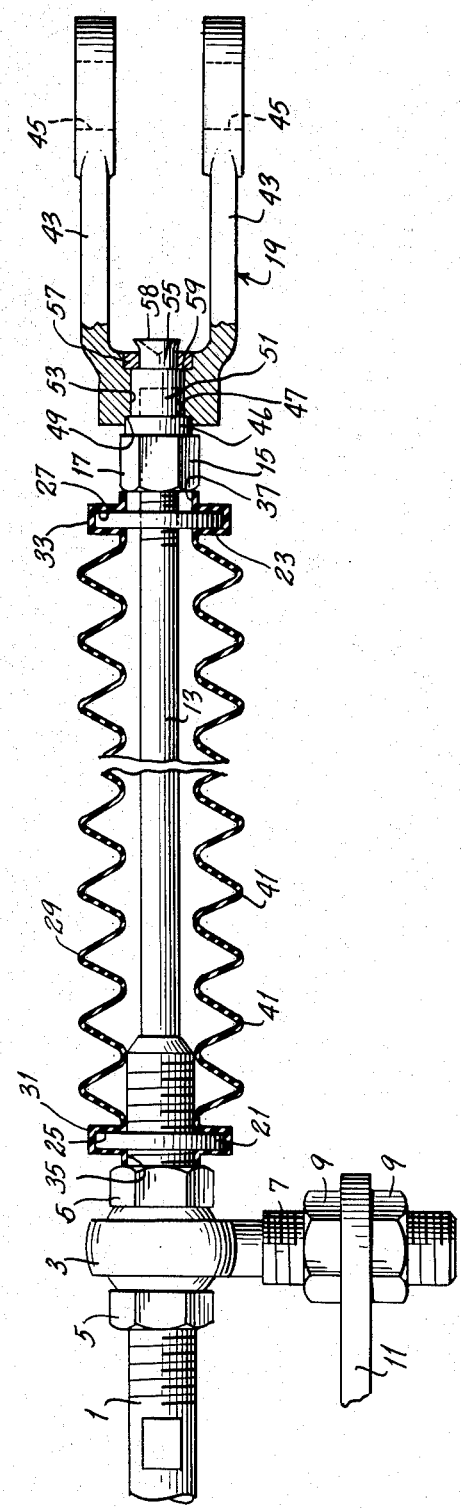
INVENTOR.
THEODORE R. BREUNICH
BY
ATTORNEYS

United States Patent Office 3,106,415
Patented Oct. 8, 1963

3,106,415
CLEVIS FOR PUSH-PULL CONTROL DEVICES
Theodore R. Breunich, Stamford, Conn., assignor to Controlex Corporation of America, White Plains, N.Y., a corporation of New York
Original application Nov. 20, 1958, Ser. No. 775,287, now Patent No. 3,019,663, dated Feb. 6, 1962. Divided and this application July 25, 1961, Ser. No. 126,608
1 Claim. (Cl. 287—91)

This invention relates to a clevis for a mechanical device having two cooperating members movable away from and toward each other. The invention more especially relates to a clevis for a mechanical device having two members movable relative to each other in translation along a line joining these members. The invention particularly relates to a mechanical device of this type in which one of the members of elongated form is slidable into and out of the other member of generally tubular form.

This application is a division of my copending patent application Serial No. 775,287, filed November 20, 1958 now Patent No. 3,019,663.

Certain control devices of the push-pull type utilize an elongated tubular member and a member within the tubular member slidable lengthwise of the tube for transmitting to a distant point control movement originated at a given point. The so-called Bowden wire is of this type. In the Patent 2,845,813 issued August 5, 1958, a device of improved form is shown for transmitting push-pull movement between distantly spaced points utilizing a flexible, tubular sheath and strips longitudinally movable therein, this device being capable of being disposed in curvi-linear form to extend as desired around bends in its course between the spaced points. In the Patent 2,841,029 issued July 1, 1958, is shown a similar push-pull flexible remote control device having at its ends control or operating rods slidably mounted in the tubular member, the rods being connectible externally to an operating means and to the operated means and the tubular member being supported at its ends against endwise movement thereof.

In devices of this character the inner member or rod which is slidably movable within the tubular member must extend at its ends outwardly beyond the tubular member in order that it may be connected to the operating means and to the mechanism to be controlled or operated.

It is the object of the invention to provide in such a mechanical device having two members movable away from and toward each other, an improved form of clevis for connecting one of said members to operating means, such as an operating handle.

The features of the clevis of this invention as well as the advantages thereof will be pointed out in the following description which should be read in connection with the accompanying drawing which shows an embodiment of the invention in a flexible tubular remote control device of the type disclosed in the patents above referred to.

In the drawing a flexible tubular sheath 1 similar to that of the Patent 2,841,029, is supported adjacent an end thereof by a bracket 3 which is secured to the sheath 1 by lock nuts 5 threaded on the sheath and bearing on the respective faces of the bracket 3. The bracket 3 is provided with a stud portion 7 threaded to receive lock nuts 9 which serve to clamp the bracket 3 to a support 11 of any suitable character. The control rod 13 of the flexible remote control device extends outwardly to the right in the drawing beyond the sheath 1 and is threaded at its end to engage the internal threads of a swivel stud 15 which is provided with a hexagon head 17, this stud engaging a clevis 19 which may be connected to an operating handle or other operating means or, on the other hand, at the proper end of the control cable to the mechanism to be controlled or operated. The construction of the clevis in cooperation with the swivel stud will be described hereinafter.

Threaded on the sheath 1 in the embodiment disclosed in the drawing is a washer 21. A similar washer 23 is threaded on the end portion of the rod 13 adjacent the hexagon head of the swivel stud 15. Preferably the diameters of these washers is the same and is such that they may be received respectively in recesses 25 and 27 which are formed in the end portions of the protector which is in the form of a sleeve 29. The sleeve thereby is supported on the washers so as to extend between the washers 21 and 23 along and about the line of relative movement of the sheath 1 and the rod 13.

The sleeve 29 in the embodiment disclosed is in the form of a bellows with the corrugations thereof generally coaxial with the line of movement of the rod 13 relative to the sheath 1. In accordance with the invention the protective sleeve 29 is made of a flexible material of sufficient elasticity so that the end portions 31, 33 which are formed to provide the recesses 25, 27 may be stretched to enlarge the openings 35, 37 thereof, so that these end portions may be placed about the peripheries of the respective discs 21, 23 as the openings 35, 37 are stretched so that the discs may enter through these enlarged or deformed openings to be received in the recesses 25, 27. Upon release of the end portions from the stretched condition these end portions 31, 33 contract so as to elastically engage the peripheries of the discs 21, 23 and thereby to exclude any deleterious or foreign material from entering the space within the protector and reaching the surface of the rod 13 which is slidable into and out of the sheath 1.

By virtue of the corrugations 41 of the sleeve 29 and of the elasticity of the flexible material utilized, the sleeve of bellows form may be extended and contracted accordion fashion concomitantly with movement of the rod 13 out of and into the sheath 1. The corrugated form of the bellows, however, provides a certain lengthwise stiffness of the protector which prevents undue sagging between the ends thereof. This resistance to sagging is aided by the rigid discs which are mounted on the sheath and on the rod and maintain at their circumference the end portions of the sleeve in proper coaxial position. The diameter of the discs and the diameter of the bellows-shaped sleeve are such also as to increase this resistance to sagging even for a substantial distance between the two relatively movable members of the mechanical device.

In mechanical devices of the type referred to and especially in those of the construction shown in the Patents 2,841,029 and 2,845,813, it has been found to be essential or desirable to avoid torsional movement and strain of the rod 13 relative to the clevis 19. Such torsional movement and strain, which may result from the operation of the flexible tubular control device itself because of its tortuous line of action, may cause binding of the clevis on the mechanical element to which the two legs 43 of the clevis may be connected, for example, by a stud or bolt inserted in the holes 45 shown in the drawing. In order to prevent such twisting of the clevis and the resulting binding, the invention provides for swivel movement of the clevis 19 on the hexagon swivel stud 15. This swivel movement may take place on the axis of the rod 13 and as a result the plane between the legs 43 of the clevis which is perpendicular to the axis of the holes 45 may take any rotational position about the axis of the rod 13 relative to this rod.

To this end the hexagon swivel stud 15 in the embodiment shown is turned to a reduced diameter to provide a cylindrical portion 46, and is still further turned to form a shoulder 47 which bears against the bottom of the recess 49 in the bottom or U of the clevis at the outside thereof. The swivel stud in this further turned portion provides a shank 51 which rotatively bears in the bore 53 in the clevis coaxial with the rod 13. The end portion 55 of the stud 15 is again reduced in diameter to receive a washer 57 which is held against the shoulder formed by the portion 55 by riveting the end 58 as shown in the drawing. The position of the shoulder of the end portion 55 against the shank 51 is such that the washer 57 when riveted into position bears on the recess 59 of the clevis with sufficient clearance to provide for the rotational movement of the clevis on the shank 51 without binding. It will be understood, therefore, that the operating handle or other member which is connected at the holes 45 of the clevis may be disposed in any desired position about the axis of the rod 13 and, if rotational movement occurs in the operation of the flexible remote control device, as described in the patents, as the rod 13 is moved in translation relative to the sheath 1, no binding of either of the members of the flexible control device or the operating handle or controlled member will occur.

Modification of the clevis construction of the invention may be made to suit different conditions while embodying the features which have been described and to which the appended claim is directed.

I claim:

A clevis for connecting a longitudinally slidable push-pull remote control member to a mechanical part supported for movement concomitant with movement of said clevis in directions generally along the length of the end portion of said control member to which said clevis is attached, said clevis being substantially U-shaped and having the outer portions of the legs thereof formed to be connected to said mechanical part, and means for connecting said clevis adjacent the bottom of the U thereof to said control member so as to provide for rotational movement of said clevis relative to said control member generally on the longitudinal axis of said end portion of said control member as an axis to prevent binding in the connection between said control member and said mechanical part, said connecting means comprising a tubular member forming the inner end of said clevis and having a central bore with enlarged end portions to provide internal annular shoulders disposed outwardly towards the ends of such bore, and a swivel stud connected to said control member and comprising a cylindrical member coaxial with said control member for rotatably supporting said tubular member, said cylindrical member being composed of three different cylindrical portions each of a different diameter and including an inner cylindrical portion of greater diameter than an intermediate cylindrical portion thereof to form an outwardly disposed shoulder therebetween, and an outer cylindrical portion of smaller diameter than the intermediate portion thereof to form therebetween a second outwardly disposed shoulder on said cylindrical member, said intermediate cylindrical portion being rotatably received in and having a length substantially equal to the portion of said bore in said tubular member between the enlarged end portions thereof, and said inner largest cylindrical portion having an outside diameter greater than the diameter of such bore between the enlarged end portions thereof and being rotatably received in one of the enlarged end portions of such bore, and a washer secured on said outer smallest cylindrical portion and engaging said second outwardly disposed shoulder of said cylindrical member, said washer having an outside diameter greater than the diameter of said bore between the enlarged end portions thereof and being rotatably received in the other of the enlarged end portions of said bore.

References Cited in the file of this patent
UNITED STATES PATENTS

| | | |
|---|---|---|
| 1,223,546 | Williams | Apr. 24, 1917 |
| 2,757,030 | Koppel | July 31, 1956 |